United States Patent [19]
Wang et al.

[11] Patent Number: 5,999,535
[45] Date of Patent: Dec. 7, 1999

[54] SHORT CUT FORWARDING OF LOCAL CELLS-IN-FRAMES TRAFFIC WITHIN LOCAL-AREA-NETWORKS

[75] Inventors: Peter S. Wang, Cupertino, Calif.; Opher Yaron; Zvika Bronstein, both of Tel Aviv, Israel

[73] Assignee: 3Com Corporation, Santa Clara, Calif.

[21] Appl. No.: 08/864,294

[22] Filed: May 28, 1997

[51] Int. Cl.[6] .................................................. H04J 3/02
[52] U.S. Cl. ........................................ 370/401; 370/466
[58] Field of Search ................................... 370/392, 395, 370/400, 401, 402, 409, 410, 466, 230

[56] References Cited

U.S. PATENT DOCUMENTS

| | | | |
|---|---|---|---|
| 5,237,564 | 8/1993 | Lespagnol et al. | 370/470 |
| 5,430,715 | 7/1995 | Corbalis et al. | 370/395 |
| 5,457,681 | 10/1995 | Gaddis et al. | 370/402 |
| 5,815,501 | 9/1998 | Gaddis et al. | 370/402 |
| 5,818,842 | 10/1998 | Burwell et al. | 370/397 |

OTHER PUBLICATIONS

Brim, Scott W., Cells In Frames Version 1.0: Specification, Analysis, and Discussion, Oct. 21, 1996, http://cif.cornell.edu/specs/v1.0/CIF–baseline.html, pp. 1–39.

McQuillan, John, Cells, Frames and Combinations, Sep. 1995, Business Communications Review, pp. 10–12.

Dixon, Roy C., Cells–In–Frames: A System Overview, Jul./Aug. 1996, IEEE Network, pp. 9–17.

*Primary Examiner*—Min Jung
*Attorney, Agent, or Firm*—Wilson, Sonsini, Goodrich & Rosati

[57] ABSTRACT

An enhanced cells-in-frames (CIF) network system for connecting a local-area-network (LAN) to an ATM network consists of CIF end-stations and an enhanced CIF attachment-device attached to a LAN segment. The enhanced CIF attachment-device in addition to performing its conventional functions, recognizes connection requests between local CIF end-stations and sets up short-cut forwarding between such end stations allowing them to transfer CIF frames directly over the Ethernet. In a conventional system such local traffic would broken up into a plurality of cells and sent over an ATM network.

22 Claims, 5 Drawing Sheets

SHORT CUT FORWARDING OF LOCAL CELLS-IN-FRAMES TRAFFIC WITHIN LOCAL-AREA-NETWORKS

BACKGROUND

The field of the present invention relates to data communication networks. In particular, the field of the invention relates to a system for enhancing data communication and for providing ATM service between end stations in a local-area-network service such as IEEE 802.

Data networks relied on shared medium, packet-based local-area-network technologies for both access and backbone connections. The use of packet switching systems such as bridges and routers to connect local-area-networks into a global Internet is now widespread. An Internet router must be capable of processing packets based on many different protocols. The complexities of building networks capable of switching packets on an international network using different protocols places a premium upon efficient implementation of data transfer.

On an Ethernet system, each computer connected to the system, also known as an end-station or work-station, operates independently of all other stations on the local-area-network. There is no central controller. All end-stations attached to an Ethernet are connected to a shared signaling system, also called the medium. Ethernet signals are transmitted over the shared signal channel to every attached station. To send data, a station first listens to the channel, and when the channel is idle the station transmits its data in the form of an Ethernet packet.

After each frame transmission, all stations on the network must contend for the next frame transmission opportunity. This ensures that access to the network channel is fair, and that no single station can lock out the other stations. Access to the shared channel is determined by the media-access-control mechanism embedded in the Ethernet interface located in each station.

The heart of the Ethernet system is the Ethernet frame, which is used to deliver data between end-stations. The frame consists of a set of bits organized into several fields. These fields include address fields, a variable size data field that carries from 46 to 1,500 bytes of data, and an error checking field that checks the integrity of the bits in the frame to make sure that the frame has arrived intact.

The first two fields in the frame carry 48 bit addresses, called the destination and source addresses. The IEEE standard controls the assignment of these addresses by administering a portion of the address field. The 48 bit address is also known as the physical address, hardware address or media-access-control address.

As each Ethernet frame is sent on to the shared Ethernet channel, all Ethernet interfaces look at the first 48 bit field of the frame, which contains the destination address. The interfaces compare the destination address of the frame with their own address. The Ethernet interface with the same address as the destination address in the frame will read in the entire frame and deliver it to the networking software running on that computer. All other network interfaces will stop reading the frame when they discover that the destination address does not match their own address.

A multicast address allows a single Ethernet frame to be received by a group of stations. Network software can set a station's Ethernet interface to recognize a specific multicast address. This makes it possible for a set of stations to be assigned to a multicast group which has been given a specific multicast address. A single packet sent to the multicast address assigned to that group will then be received by all stations in that group.

Ethernet technology is widely used for local-area-networks, and it is common to link such local-area-networks into a wide area network system. An asynchronous-transfer-mode network is one such system. Asynchronous-transfer-mode networks, however, operate very differently than a connectionless Ethernet system. In an Asynchronous-transfer-mode network a point-to-point connection must be established within the network and remains for the duration of the data transfer. Asynchronous-transfer-mode networks are thus connection-oriented as opposed to the connectionless Ethernet system. Furthermore the data is transmitted in short, 53 byte, fixed length cells, not in variable length frames.

In order to use existing local-area-network application software with an asynchronous-transfer-mode network, it is necessary to define an asynchronous-transfer-mode service such as a local-area-network emulation system that emulates services of existing local-area-networks across an asynchronous-transfer-mode network. In a local-area-network emulation service provided for in an asynchronous-transfer-mode network, end-stations such as work stations, servers, bridges, or the like can connect to the asynchronous-transfer-mode network while the software applications interact as if they are attached to a traditional local-area-network. Such service supports inter-connection of asynchronous-transfer-mode networks with traditional local-area-networks by means of well known bridging methods. This achieves inter-operability between software applications residing on asynchronous-transfer-mode attached end-stations and on traditional local-area-network end-stations. The local-area-network service provides a simple and easy means for running existing local-area-network applications in the asynchronous-transfer-mode environment.

In order to facilitate the implementation of asynchronous-transfer-mode networks and utilize their well known advantages, including quality of service control, the cells-in-frames protocol was developed. Cells-in-frames is a method which allows asynchronous-transfer-mode emulation across a local-area-network, the inverse of local-area-network emulation. With cells-in-frames, end-stations attached to a local-area-network such as IEEE 802 can set up asynchronous-transfer-mode connections and send asynchronous-transfer-mode cells across the local-area-network. This is accomplished by encapsulating the fixed length asynchronous-transfer-mode cells within Ethernet frames, thus the name cells-in-frames. The cells-in-frames end-stations package the asynchronous-transfer-mode cells into Ethernet frames and send them over the local-area-network to a cells-in-frames attachment-device. The attachment-device strips the cells from the frames and sends them out over an attached asynchronous-transfer-mode network to the asynchronous-transfer-mode-address indicated by the end-station.

On the Ethernet, cells-in-frames frames have a standard Ethernet version 2 header and trailer. The first eight octets of the frame payload contain the cells-in-frames header, the first octet defining the cells-in-frames format identifier. Only three format types are defined. Format 0 is used for cells-in-frames signaling from the end-stations. Format 1 is used for cells-in-frames signaling from the attachment-device and format 2 is the default format for carrying user traffic. Before user traffic can be transmitted using cells-in-frames, a cells-in-frames link between the transmitting and receiving cells-in-frames devices must be established.

The cells-in-frames end-stations control the process of cells-in frames link activation. The attachment-device only responds to the end-stations messages, it does not initiate any exchanges itself. The cells-in-frames end-station initializes the cells-in-frames link by sending a cells-in-frames format 0 frame. The end-station sends this message periodically until a cells-in-frames attachment-device responds. Neither the cells-in-frames end-station nor the cells-in-frames attachment-device is required to know the other's media-access-control address, thus the cells-in-frames end-station sends this format 0 frame to a media-access-control multicast address that is assigned specifically for the purpose of media-access-control address discovery and link activation.

At the time of link activation, a cells-in-frames attachment-device waits, silently, until it receives a cells-in-frames format 0 frame from a cells-in-frames end-station. When it receives one, it learns that cells-in-frames end-station's individual media-access-control address, as well as the cells-in-frames options the cells-in-frames end-station requests and is willing to support. The cells-in-frames attachment-device begins sending cells-in-frames format 1 frames to this cells-in-frames end-station, using the cells-in-frames end station's individual media-access-control-address as the destination address, and declares the cells-in-frames link to that end-station to be in an up state.

Upon receipt of a cells-in-frames format 1 frame, the cells-in-frames end-station learns the media-access-control address of the cells-in-frames attachment-device, as well as what cells-in-frames options the cells-in-frames attachment-device requests and is willing to support. At that time it declares the link to be up and begins sending only unicast frames destined to the cells-in-frames attachment-device's individual media-access-control address.

Once a cells-in-frames link has been established the transmitting cells-in-frames end-station can begin forwarding cells-in-frames type 2 frames, so called payload frames, to the media-access-control address of the attachment-device. The attachment-device then extracts the asynchronous-transfer-mode cells from the incoming frames and forwards them through the backbone asynchronous-transfer-mode network to their destination asynchronous-transfer-mode address.

One problem with this system arises when a cells-in-frames end-station requests a cells-in-frames connection to a local cells-in-frames end-station, i.e. an end-station attached off the same local-area-network. In this instance the end-station will proceed to establish a link with an attachment-device and setup a link over which to transmit its payload frames. The attachment-device will extract the asynchronous-transfer-mode cells from the payload frames and send them out over the asynchronous-transfer-mode network, not realizing the destination end-station is located on the same local-area-network segment. These cells will be received back by the same attachment-device or another one attached to the same local-area-network, which will reconstruct the frames and forward them to the destination end-station.

This procedure loads down the attachment devices with unnecessary translation of frames to cells and back to frames. Additionally the round-about path taken by the data translates into slower transfer rates and a less efficient network system. What is needed is a method and apparatus for implementing such a method, to short cut forward such local cells-in-frames traffic. Such a method would allow local cells-in-frames end-stations to send cells-in-frames frames directly to each other over the local-area-network.

SUMMARY OF THE INVENTION

These and other problems of the prior art are overcome in accordance with the present invention by adding additional functionality to the cells-in-frames network system. In addition to the conventional functions, the enhanced cells-in-frames network system of the present invention has the ability to learn which cells-in-frames end-stations are attached off the same local-area-network segments. Thus when a cells-in-frames connection is attempted by an end-station on a local-area-network segment to another end-station on that same local-area-network segment, the end-station will know, or can be informed by another element of the network, to route these frames directly to the destination end-stations local address.

In a conventional system such frames would be routed through the cells-in-frames attachment-device where they are broken up into a plurality of cells and sent out over an asynchronous-transfer-mode network. The cells would be received back by the same attachment-device or another such device attached to the same local-area-network segment, reconstructed into frames and forwarded over the local-area-network to the destination end-station. Depending on the amount of local cells-in-frames traffic on the local-area-network this invention can greatly reduce the load on the attachment-devices, and reduce the necessary number of attachment-devices for a given local-area-network segment, thereby reducing the cost and increasing the efficiency of the cells-in-frames network system. An additional advantage of the present invention is the reduction of traffic on the asynchronous-transfer-mode network.

An aspect of the invention enables local cells-in-frame frame to be transmitted directly over a local-area-network. Another aspect of the invention reduces the load on the attachment devices in a cells-in-frames network system. The invention also reduces the load on the asynchronous-transfer-mode network in a cells-in-frames network system. Other aspects of the invention reduce the number of attachment-devices necessary on a local-area-network segment of a cells-in-frames network system, and reduce the cost of a cells-in-frames network system. The foregoing aspects of the invention also increase the efficiency of transmission of local cells-in-frames traffic on a cells-in-frames network system.

These and other advantages and objects of the invention can be understood from the following description of apparatus and methods in accordance with the present invention, which is described in conjunction with the drawings.

DETAILED DESCRIPTION

The introduction of ATM (asynchronous transfer mode) networks into established environments requires a significant rebuilding of the infrastructure. For example, rebuilding may involve complete re-cabling and new network interface cards for all workstations in the environment which are communicating to the ATM network. This may be a disincentive to the early adoption of ATM based multimedia services and workstations. An aspect of the present invention is directed to solving the problem of providing ATM based networking in a LAN (local-area-network) environment.

Figure 1:
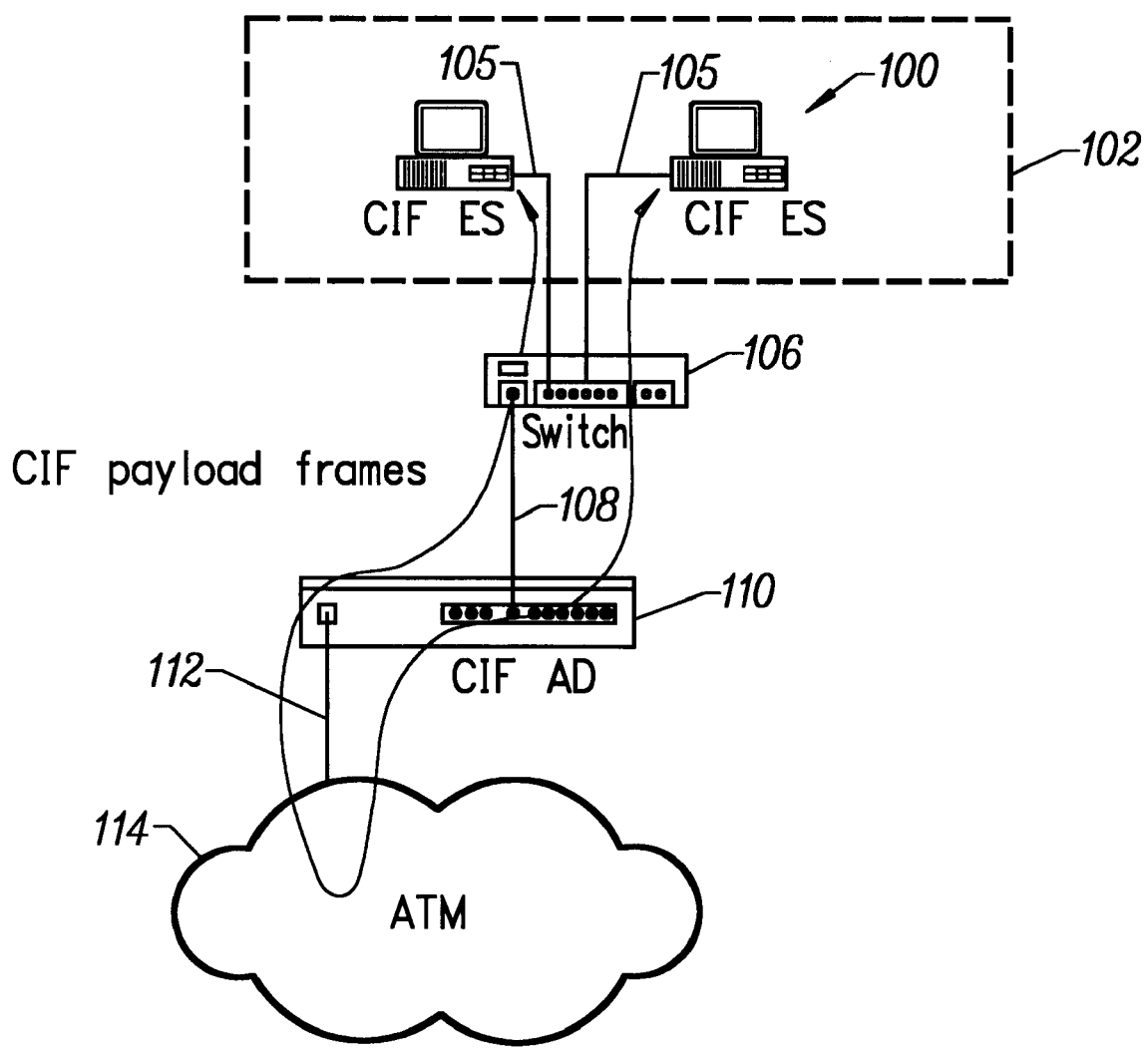
FIG. 1 is a schematic diagram of a cells-in-frames network system, including the flow of local cells-in-frames traffic before the implementation of an embodiment of the invention.

FIG. 1 shows the data path of local CIF (cells in frames) frames in a conventional system having connectivity to an ATM network. As seen from FIG. 1, forwarding of CIF traffic between end stations 100 of a representative IEEE 802 LAN segment 102 is complex. The data path between CIF end stations 100 is shown by the arrows. The system as seen in FIG. 1 comprises a plurality of CIF end-stations 100 (hereafter called end-stations), connected to an IEEE 802 local-area-network segment 102. Also attached to the IEEE 802 local-area-network segment is an Ethernet switch 106. The Ethernet switch 106 is further attached to a lead 108, which connects the switch to a cells-in-frames attachment-device 110 (hereafter called attachment-device). The attachment-device is further connected via a second lead 112 to an asynchronous-transfer-mode network 114. As seen from FIG. 1, the forwarding of CIF traffic between end stations 100 on the LAN segment 102 creates a complex data path which must go through Ethernet switch 106, attachment-device 110 and ATM network 114.

ATM is a packet switch system based on short, fix length cells. Each cell consists of 48 bytes of user data and a 5 byte header, carrying a VCI (Virtual Channel Identifier) and VPI (Virtual Path Identifier) in the header. Cells must be routed through switching nodes, as is well known using the combination of VPI and VCI as a label to associate each cell with established virtual connections.

An aspect of the invention is to provide ATM services to the desk top user such as end stations 100 without having to force users to actually change the connection to the desk top. ATM offers advantages due to shorter cells of data traffic. This enables one to achieve greater control over delivery latency and jitter. An aspect of the invention uses a CIF frame to take the ATM paradigm and extend it out to the end stations 100 on the Ethernet LAN segment 102. Combining ATM with Ethernet work stations necessitates the use of CIF frames. If one sets up an ATM circuit between two end stations such as end stations 100 one must actually run through the ATM protocol. This requires a virtual connection along the data paths shown by the arrows in FIG. 1. This requires that data traffic between even two adjacent end stations on the Ethernet must go through the switch 106 attachment device 110 and into the ATM fabric 114. What is needed is a way to recognize that the receiving end stations 100 are on the same LAN segment 102.

Figure 2:
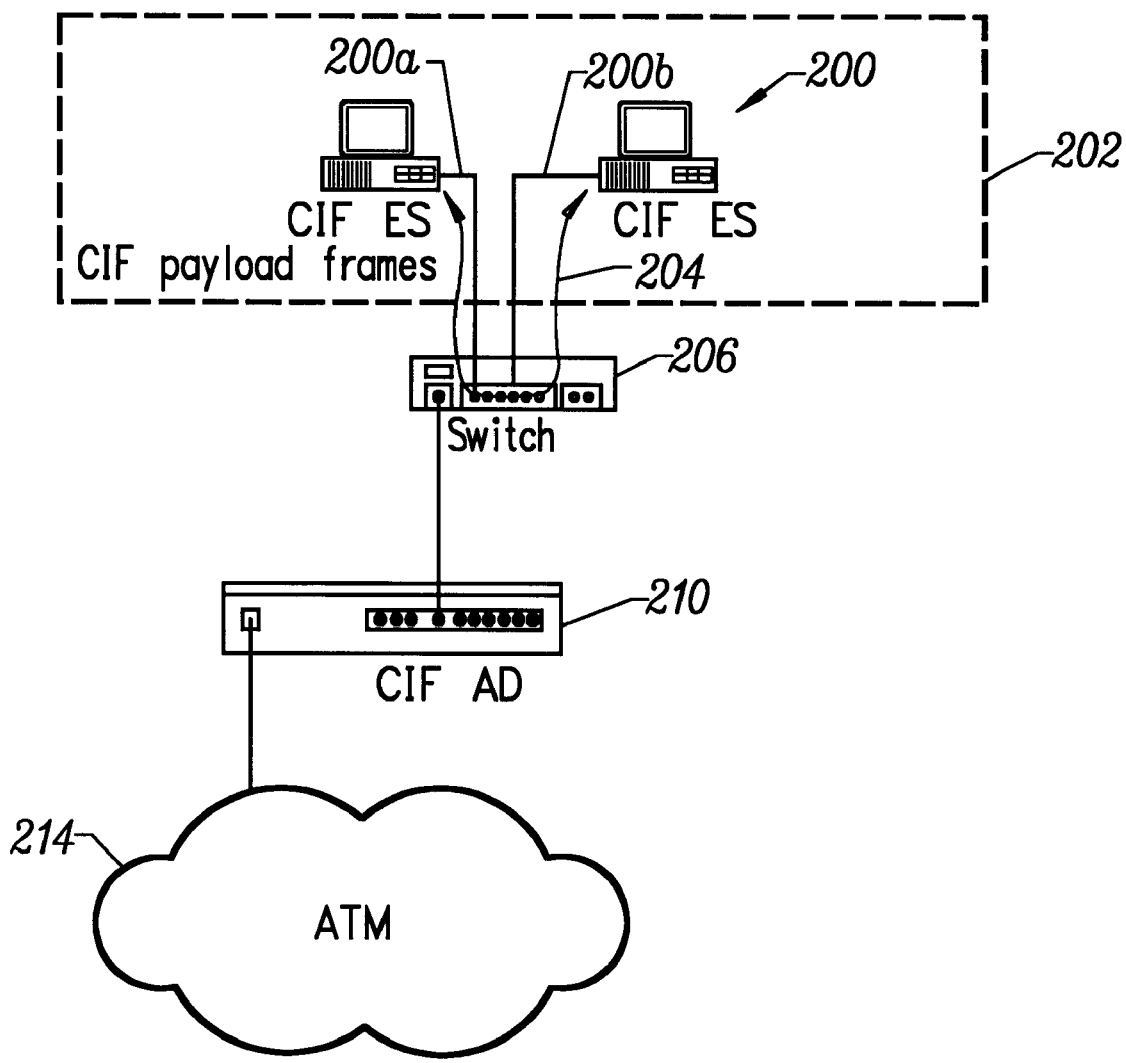
FIG. 2 is a schematic diagram of an enhanced cells-in-frames network system consistent with an embodiment of the invention, including the flow of local cells-in-frames traffic after the implementation of an embodiment of the invention.

Referring to FIG. 2, an aspect of the invention is directed to a system that satisfies the need for an enhanced cells-in-frames network system capable of more efficiently transmitting frames of cells-in-frames between end-stations located on the same IEEE 802 local-area-network segment. In addition to performing its conventional functions, an enhanced attachment-device 210 is programed to learn the asynchronous-transfer-mode and media-access-control addresses of all end-stations 200 attached to the IEEE 802 local-area-network segment 202. This is accomplished by programming the enhanced attachment-device 210 to monitor traffic on the IEEE 802 local-area-network 200, a function that it normally performs, and to record the asynchronous-transfer-mode and corresponding media-access-control-addresses of all end-stations 200 sending or receiving cells-in-frames frames on the IEEE 802 local-area-network segment 202. The addresses are stored in a database in the enhanced attachment-device 210. In this way the attachment device 210 will learn all of the addresses of end-stations 200 local to the IEEE 802 local-area-network 210. In addition, the enhanced attachment-device 210 is programed such that, given the asynchronous-transfer-mode address of one of the local end-stations 200, it can readily look-up the corresponding media-access-control-address for that end-station in a database, such as a table of addresses stored in its memory.

The attachment-device 210 is programmed such that, upon receipt of an asynchronous-transfer-mode connection request from a transmitting end-station 200, it checks whether the request is for connection to a local receiving end-station, located on the IEEE 802 local-area-network segment 202. This amounts to checking the asynchronous-transfer-mode addresses provided in the connection request against those populated in the database of local addresses.

The attachment-device 210 is further programmed such that if the connection request is found to be from one local end-station to another, it sends a special connection setup acknowledgment message to the communicating end-stations media-access-control addresses. The special connection setup acknowledgment message indicates the same virtual-path-identifier/virtual-channel-identifier, and the media-access-control addresses of the communicating end-stations, the so called short-cut information. The end-stations 200 are programmed such that upon receipt of such a special connection acknowledgment message they record the short-cut information. The end-stations 200 are further programed such that the transmitting end-station then proceeds to forward cells-in-frames payload frames directly to the destination end-station's media-access-control address. When this is done the cells-in-frames payload frames are forwarded by Ethernet switching, and do not require any assistance or translation into the asynchronous-transfer-mode network and back. Moreover, since an intermediate low-cost Ethernet switch such as shown at 206 aggregates a number of end-stations 200, the cells-in-frames payload frames between these end-stations are forwarded by this switch and completely off-loaded from the attachment-device 210.

FIG. 2 shows the data path 204 of the traffic between CIF end stations 200 in accordance with an aspect of the present invention. By providing the short-cut information to the end-stations the enhanced attachment-device 210 avoids breaking up the frames into cells, sending them out over the asynchronous-transfer-mode network 214, receiving the cells back from the asynchronous-transfer-mode network 214, reconstructing the frames and forwarding them on to the receiving end-station over the IEEE 802 local-area-network 202. With the implementation of this aspect of the invention, local cells-in-frames frames are transmitted directly over the IEEE 802 local-area-network 202 as shown by the data path 204 in FIG. 2.

In a second embodiment of the invention, rather than enhancing the attachment-device 210 to recognize connection requests between local end-stations 200, the end-stations 200 are enhanced to perform this function. Thus, the end-stations 200 are programmed to monitor cells-in-frames link set up traffic on the IEEE 802 local-area-network 202 and to record asynchronous-transfer-mode and corresponding media-access-control addresses of local end-stations. The addresses are stored in a database in the memory of the enhanced end-stations 200. The end-stations 200 are further programed to check the destination asynchronous-transfer-mode address of cells-in-frames frames to be transmitted to determine whether they are being sent to a local end-station. When it is determined that CIF frames are being sent to a local end-station 200, a transmitting end-station looks up the corresponding media-access-control address of the receiving end-station and sends a special setup acknowledgment message to that media-access-control address over the IEEE 802 local-area-network 202. The end-stations 200 are programed to recognize this special setup acknowledgment message and respond by sending a connection confirmation message back to the transmitting end-station's media-access-control address. Upon receipt of the connection confirmation message, the transmitting end-station 200a proceeds to forward cells-in-frames frames directly to the receiving end-station 200b over the IEEE 802 local-area-network 202.

In a manner similar to the first embodiment, this embodiment reduces the load on the attachment-device 210 by allowing local traffic of CIF frames to be sent directly to the receiving end-station over the IEEE 802 local-area-network 202, bypassing the asynchronous-transfer-mode network 214 and attachment-device 210.

A third embodiment of the invention directed toward an enhanced method of operation of a cells-in-frames network system also can be shown with reference to FIG. 2. In this embodiment, the cells-in-frames network system performs all of its conventional functions in addition to allowing end-stations 200 on the same IEEE 802 local-area-network 202 segments attached off the same attachment-device 210 to send cells-in-frames frames to each other directly over the IEEE 802 local-area-network 202. The enhanced method of operation involves each attachment-device 210 learning which end-stations 200 are attached off the same IEEE 802 local-area-network segments 202. This is accomplished by having each attachment-device 210 monitor cells-in-frames link set up traffic on the IEEE 802 local-area-network 202 to which it is attached, and to record the asynchronous-transfer-mode and corresponding media-access-control addresses of each end-station attached thereto. Upon receiving a connection request from a transmitting end-station 200a for connection to a receiving end-station 200b, the attachment-device 210 determines whether the communicating end-stations are attached on the same IEEE 802 local-area-network segment 202. If they are, the attachment-device 210 sends a special setup acknowledgment message to the communicating end-stations 200a, 200b indicating the media-access-control addresses of the communicating end-stations and a virtual-path-identifier/virtual-channel-identifier for an asynchronous-transfer-mode connection. Upon receiving the special setup acknowledgment message, the transmitting end-station 200a proceeds to forward cells-in-frames frames to the receiving end-station 200b directly over the IEEE 802 local-area-network 202.

Figure 3:
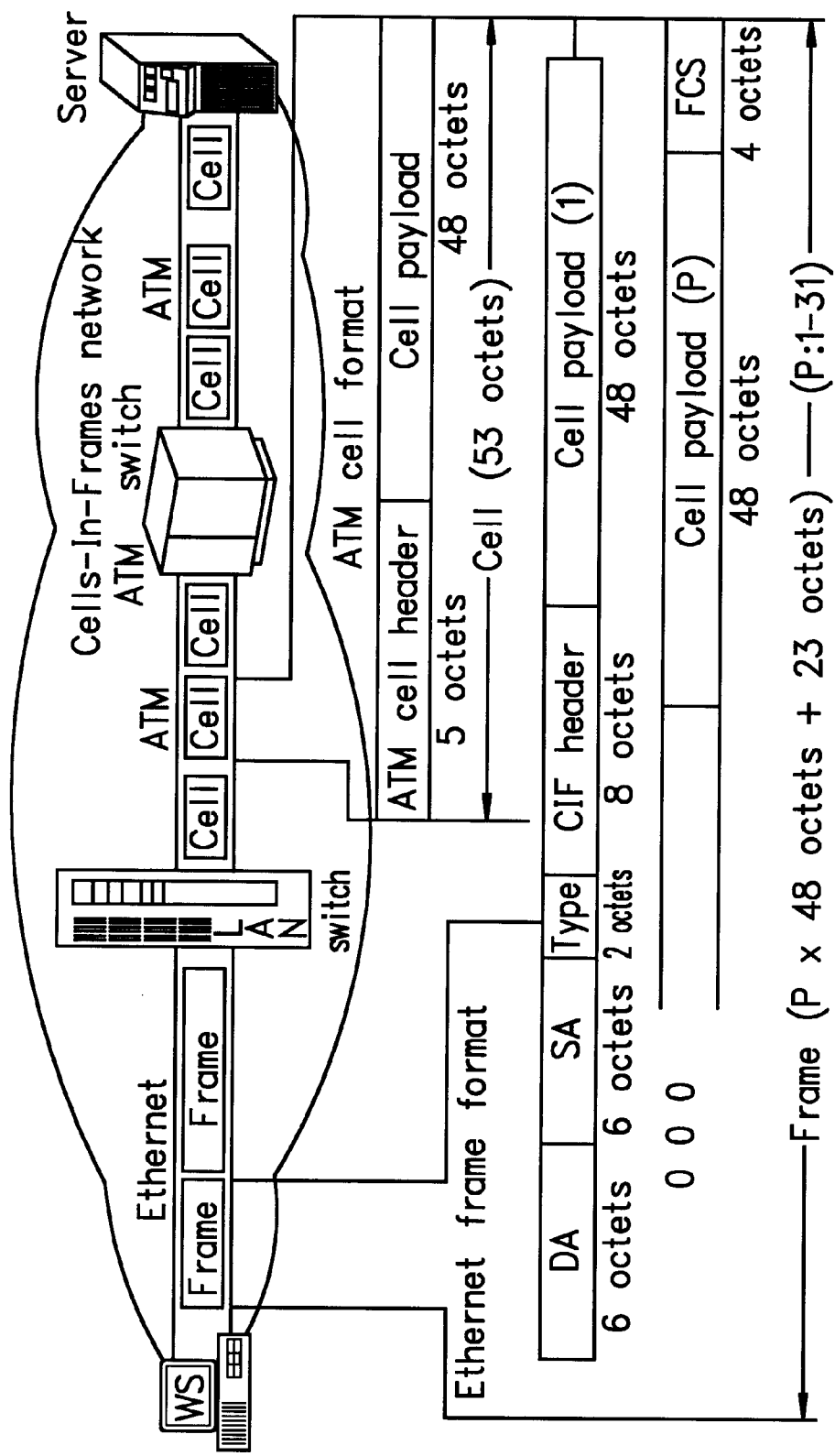
FIG. 3 is a schematic diagram showing conventional Ethernet frame format and asynchronous transfer mode cell format.

FIG. 3 shows an outline of typical ATM cell format and Ethernet cells-in-frames frame format. Standard ATM cell format has a five octet header, which can include four bits flow control, eight bits virtual path identifier, sixteen bits virtual channel identifier, three bits type identifier, one bit cell loss priority and eight bits header checksum. Additionally a forty eight octet cell payload is included in the cell. The cell payload contains the data to be transmitted across the network.

In a cells-in-frames frame many ATM cells are contained in a single Ethernet frame. The Ethernet frame typically includes, six octets destination media-access-control address, six octets source media-access-control address, two octets type identifier, five octets ATM cell header and multiple, up to thirty one, forty eight octet ATM cell payloads. Additionally, a four octet frame check sequence is attached to the end of the frame, which allows verification of complete frame delivery by the receiving station.

Figure 4:
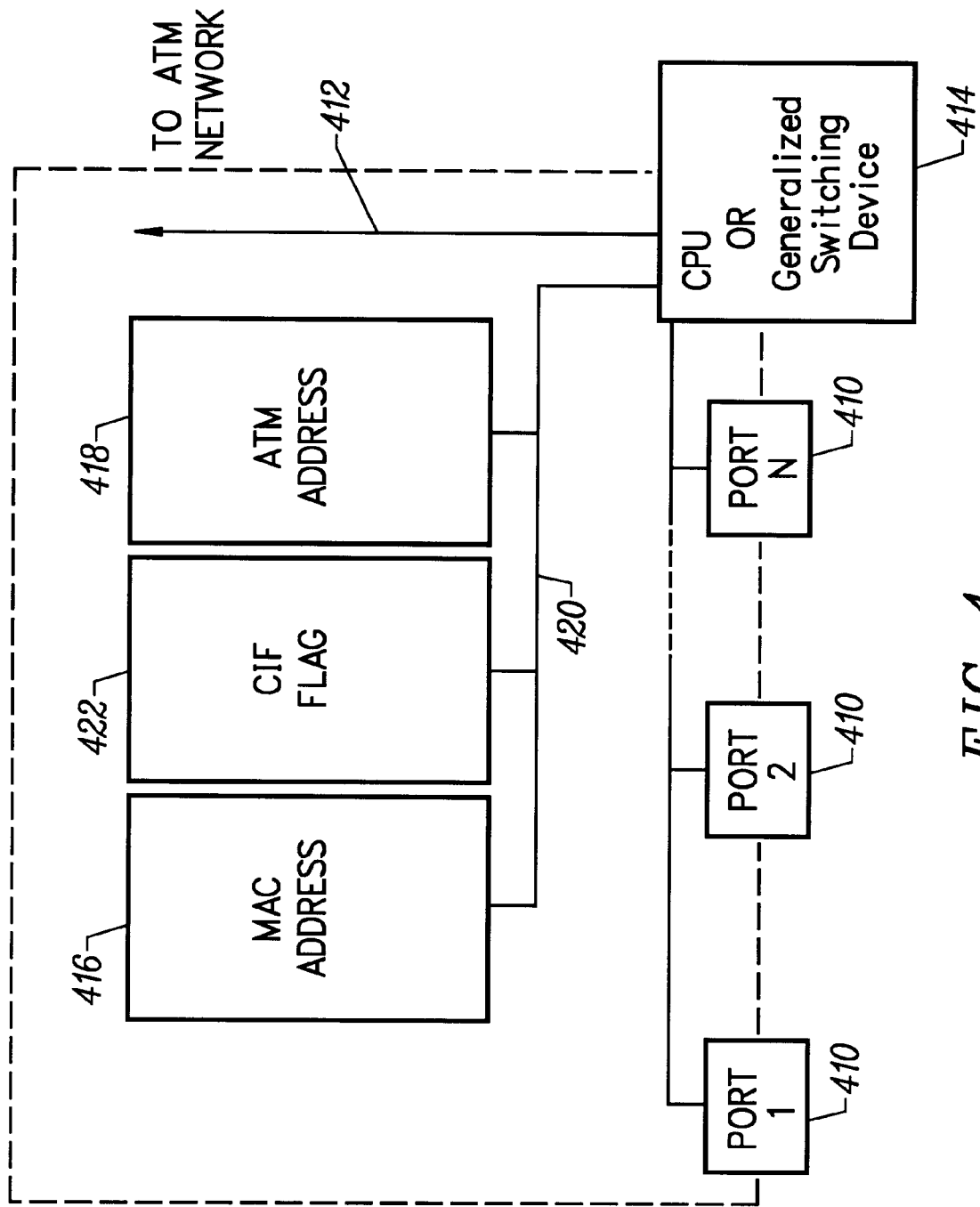
FIG. 4 is a schematic diagram showing an overview of some basic features of a cells-in-frames attachment device.

FIG. 4 is a generalized representation of a cells-in-frames attachment device, intended only to represent an overview of some basic features. The ports 410 one through N are attached to an Ethernet network and the output line 412 is attached to an ATM network. Additionally a CPU or generalized switching device 414 is shown, which can be programmed to provide a variety of functions including those required for processing cells-in-frames traffic between the Ethernet and ATM networks. A table 416 of MAC addresses and a corresponding table 418 of ATM addresses is shown attached by bus 420 to CPU 414. Also shown is the cells-in-frames flag 422 which represents a unique typically two octet cells-in-frames type identifier. Cells-in-frames frames can be identified by comparing cells-in-frames flag 422 with the two octet type identifier in the frame header.

Figure 5:
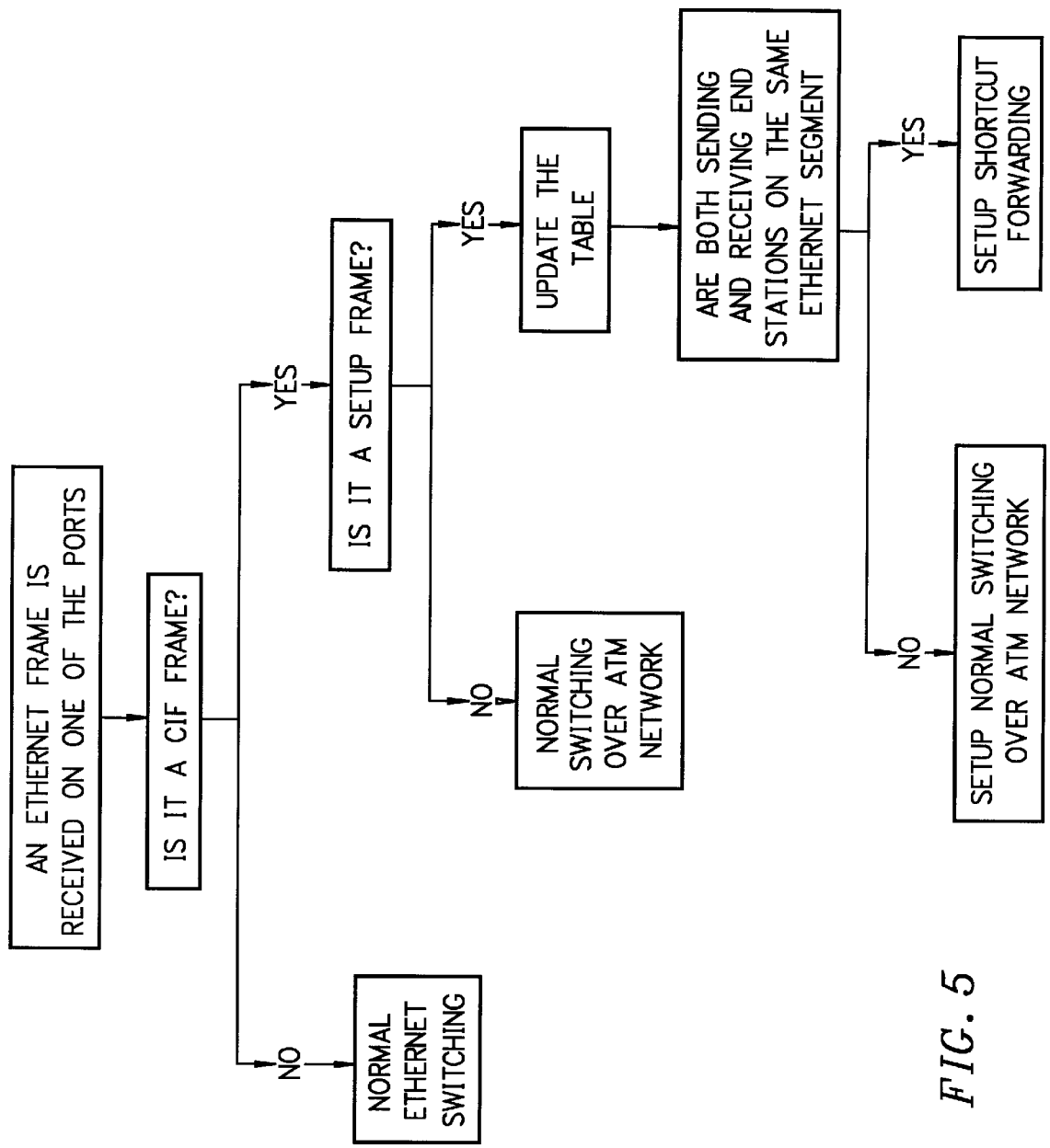
FIG. 5 is a diagram of a flow chart according to an aspect of the present invention.

Referring now to the attachment device of FIG. 4 and the flow chart of FIG. 5, when an Ethernet frame is received on one of the ports 410, the CPU 414 compares the frame type identifier with the cells-in-frames flag 422. If the frame is not a cells-in-frames frame, normal Ethernet switching occurs. If the frame is a cells-in-frames frame then the CPU 414 reads the cells-in-frames header to determine the type of cells-in-frames frame. If the frame is not a setup frame i.e. not a format 0 frame for signaling from the end stations, then normal cells-in-frames processing occurs. However, if the frame is a setup frame, the source media-access-control and corresponding source ATM addresses are read and the tables of media-access-control addresses 416 and corresponding ATM addresses 418 are updated. In this way as the attachment device processes cells-in-frames frames it will gradually build up an extensive table of local media-access-control and corresponding ATM addresses. Next the CPU 414 checks the destination ATM address of the cells-in-frames frame against the table 418 of local ATM addresses. If the destination address is a local ATM address short-cut-forwarding is initiated as described above, otherwise conventional cells-in-frames forwarding over the ATM network is initiated.

While the invention has been described in connection with what is presently considered to be the most practical and preferred embodiments, it is to be understood that the invention is not limited to the disclosed embodiments, but on the contrary is intended to cover various modifications and equivalent arrangements.

For example, the invention will work with multiple combinations of switches and/or Ethernet repeater devices. Therefore, persons of ordinary skill in this field are to understand that all such equivalent systems are to be included within the scope of the following claims.

What is claimed is:

1. A method of operation for a cells-in-frames (CIF) network system which enables CIF end-stations on the same local-area-network (LAN) segments attached off the same CIF attachment-device to send CIF frames to each other directly over the LAN, the method comprising:

learning by each CIF attachment-device which CIF end-stations are attached off the same LAN segments, learning including:

monitoring by each CIF attachment-device of traffic on the LAN attached thereto; and recording ATM and corresponding MAC addresses of the CIF end-stations attached to said LAN;

receiving by a CIF attachment-device of an asynchronous-transfer-mode (ATM) connection request from a first CIF end-station for connection to a second CIF end-station, wherein recording includes recording ATM and corresponding MAC addresses of the second CIF end-station;

determining by said CIF attachment-device whether said first CIF end-station is located on the same LAN segment as said second CIF end-station;

responsive to determining that said first CIF end-station is located on the same LAN segment as said second CIF end-station transmitting by said CIF attachment device to said first and second CIF end-stations a setup acknowledgment message indicating media-access-control (MAC) addresses of said first and second end-stations;

receiving said setup acknowledgment message by said CIF end-stations;

transmitting CIF frames by said first CIF end-station to said MAC address of said second CIF end-station; and receiving of said CIF frames by said second CIF end-station.

2. A method according to claim 1 wherein said setup acknowledgment message also indicates the same virtual-path-identifier (VPI) and virtual-channel-identifier (VCI) to said first and second end-stations.

3. A method according to claim 1 wherein said LAN is an IEEE 802 LAN.

4. A cells-in-frames (CIF) network system for connecting a local-area-network (LAN) to an ATM network comprising:
   a plurality of CIF end-stations;
   a LAN segment to which said CIF end-stations are attached; and
   an enhanced CIF attachment-device connected to said LAN segment, said enhanced CIF attachment-device comprising:
      means for recognizing a connection request from a first CIF end-station to a second CIF end-station, the means for recognizing a connection request including:
         means for learning which CIF end-stations are attached to the LAN segment, the means for learning including:
            means for monitoring by each CIF attachment-device of traffic on the LAN attached thereto; and
            means for recording ATM and corresponding MAC addresses of the second CIF end-station; and
         means, responsive to said connection request, for sending said first and second CIF end-stations a setup acknowledgment message containing the media-access-control (MAC) addresses of said first and second CIF end-stations, such that said first and second CIF end-stations can send CIF frames directly to each other over said LAN.

5. A system as in claim 4 wherein said enhanced CIF attachment-device is connected to said LAN segment through an Ethernet switching device.

6. A system as in claim 5 wherein a plurality of CIF attachment devices are connected to said LAN segment through said Ethernet switching device.

7. A system as in claim 4 wherein said enhanced CIF attachment device is connected to said LAN segment through one or more Ethernet repeater devices.

8. A system as in claim 4 wherein a plurality of CIF attachment devices are connected to said LAN segment.

9. A system as in claim 4 wherein said setup acknowledgment message also indicates the same virtual-path-identifier (VPI) and virtual-channel-identifier (VCI) to said first and second end-stations.

10. A system as in claim 4 wherein said LAN is an IEEE 802 LAN.

11. A method of operation of a cells-in-frames (CIF) network system which allows CIF end-stations attached on the same local-area-network (LAN) segment to send CIF frames directly to each other over the LAN, the method comprising:
   learning by each CIF end-station which CIF end-stations are attached off the same LAN segment learning including:
      monitoring by each CIF attachment-device of traffic on the LAN attached thereto; and
      recording ATM and corresponding MAC addresses of the CIF end-stations attached to said LAN;
   checking by a transmitting CIF end-station whether CIF frames to be transmitted to a receiving CIF end-station are being sent to a local CIF end-station, said local CIF end-station comprising a CIF end-station located on the same LAN segment as the transmitting CIF end-station;
   wherein recording includes recording ATM and corresponding MAC addresses of the receiving CIF end-station; and
   sending by said transmitting CIF end-station CIF frames directly to said receiving CIF end-station over said LAN, when the receiving CIF end-station is determined to be a local CIF end-station.

12. A method of claim 11 wherein said step of sending by said transmitting CIF end-station further comprises:
   sending by said transmitting CIF end-station a setup acknowledgment message to said local CIF end-station;
   sending by said local CIF end-station a connection confirmation message to said transmitting CIF end-station; and
   sending by said transmitting CIF end-station CIF payload frames to said local end-station.

13. A method according to claim 12 wherein said setup acknowledgment message indicates the asynchronous-transfer-mode (ATM) and media-access-control MAC addresses of said transmitting CIF end-station.

14. A method according to claim 13 wherein said setup acknowledgment message also indicates a virtual-path-identifier (VPI) and virtual-channel-identifier (VCI) for an ATM connection.

15. A method according to claim 11 wherein said LAN is an IEEE 802 LAN.

16. An enhanced cells-in-frames (CIF) attachment-device connected to a local-area-network (LAN) segment, said enhanced CIF attachment-device comprising:
   means for recognizing a connection request from a first CIF end-station to a second CIF end-station, the means for recognizing a connection request including means for learning which CIF end-stations are attached to the LAN segment, the means for learning including:
      means for monitoring by each CIF attachment-device of traffic on the LAN attached thereto; and
      means for recording ATM and corresponding MAC addresses of the second CIF end-station; and means, responsive to said connection request, for sending said first and second CIF end-stations a setup acknowledgment message containing the media-access-control (MAC) addresses of said first and second CIF end-station, such that said first and second CIF end-stations can send CIF frames directly to each other over said LAN.

17. An enhanced CIF attachment-device as in claim 16 wherein said setup acknowledgment message also indicates the same virtual-path-identifier (VPI) and virtual-channel-identifier (VCI) to said first and second CIF end-stations.

18. An enhanced CIF attachment-device as in claim 16 wherein said LAN is an IEEE 802 LAN.

19. An enhanced cells-in-frames (CIF) network system for connecting a local-area-network (LAN) to an asynchronous-transfer-mode (ATM) network comprising:

an ATM network;

a CIF attachment-device connected to said ATM network;

a LAN segment to which said CIF attachment-device is also connected; and a plurality of enhanced CIF end-stations connected to said LAN segment, said enhanced end-stations comprising:

means for recognizing local CIF end-stations, the local CIF end-stations being those CIF end-stations attached off the same LAN segment, the means for recognizing including means for learning which CIF end-stations are attached to said LAN segment, the means for learning including:

means for monitoring by each CIF attachment-device of traffic on the LAN attached thereto; and means for recording ATM and corresponding MAC addresses of the second CIF end-station; and means for checking whether CIF frames to be transmitted are being sent to local CIF receiving end-stations;

wherein recording includes recording ATM and corresponding MAC addresses of the receiving CIF end-stations; and means, responsive to said check, for sending frames directly to local CIF end-stations over said LAN.

20. A system as in claim 19 wherein said LAN is an IEEE 802 LAN.

21. An enhanced cells-in-frames (CIF) end-station comprising:

means for recognizing local CIF end-stations, local CIF end-stations being those CIF end-stations attached off the same local-area-network (LAN) segment, said means for recognizing local CIF end-stations include means for monitoring traffic on said LAN attached thereto and means for recording asynchronous-transfer-mode (ATM) and corresponding media-access-control (AC) addresses of receiving CIF end-stations attached to said LAN;

means for checking whether CIF frames to be transmitted are being sent to local CIF end-stations, and means, responsive to said check, for sending frames directly to local CIF end-stations over said LAN.

22. An enhanced CIF end-station as in claim 21 wherein said LAN is an IEEE 802 LAN.

* * * * *